No. 1,767. REISSUED SEPT. 13, 1864

A. H. VAN GIESON & E. A. SMITH.

LEATHER SPLITTING MACHINE.

Witnesses.

E. A. Roberts.

H. James Weston.

Inventor.

A. H. Van Gieson.

UNITED STATES PATENT OFFICE.

A. H. VAN GIESON AND EBENEZER A. SMITH, OF NEWARK, NEW JERSEY, ASSIGNEES, BY MESNE ASSIGNMENTS, OF A. H. VAN GIESON.

LEATHER-SPLITTING MACHINE.

Specification forming part of Letters Patent No. 35,850, dated July 8, 1862; Reissue No. 1,767, dated September 13, 1864.

*To all whom it may concern:*

Be it known that A. H. VAN GIESON, of Newark, in the county of Essex and State of New Jersey, did invent a certain Improved Leather-Splitting Machine, of which the following is a specification.

One of the principal difficulties which attach to the machines in ordinary use for splitting leather arises from the fact that the leather being straightened and kept in position for splitting by compression applied in close proximity to or upon the cutting-edge, the thickness of the split taken off upon the gaged side of the leather is thereby affected, owing to the unequal compression of the leather.

One of the principal objects of the present invention is to obviate this difficulty, and to secure evenness and uniformity in the thickness of the gaged split. To accomplish this we propose to prepare the leather for splitting before it reaches the knife, and to hold it against the splitting by tension instead of by pressure.

In the improved machine for carrying this principle into effect, the leather is first spread out into a plain sheet at a sufficient distance from the cutting-edge of the knife to prevent whatever pressure it may be necessary to apply in the accomplishment of this purpose from interfering with the freedom of the leather from pressure against the edge of the knife, except by tension of the leather itself, and the parts of the machine are so constructed, combined, and arranged, as to apply as little pressure in advance of the knife as possible in properly-spreading and stretching it for splitting.

Figure 1:
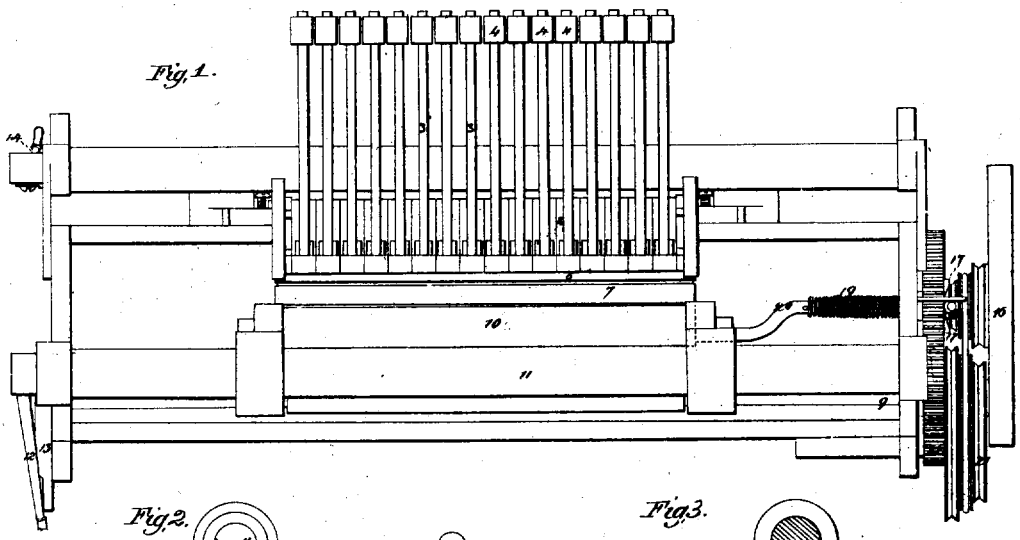
Figure 2:
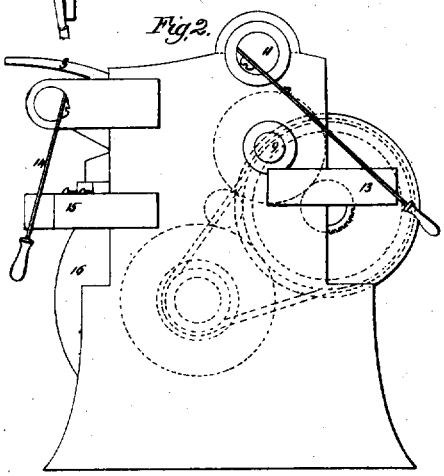
Figure 3:
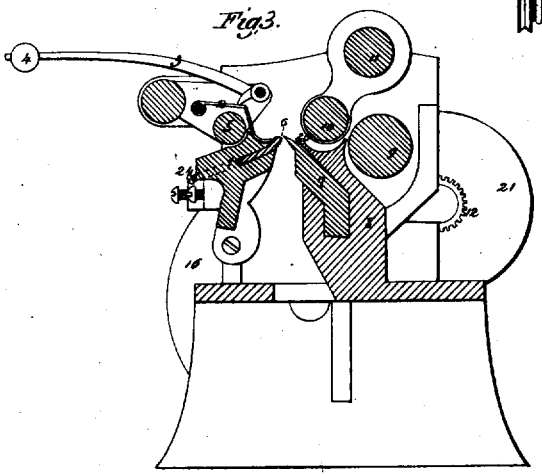
Figure 4:
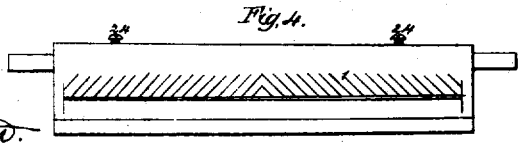

In the drawings, Figure 1 is a plan of the improved machine. Fig. 2 is an end elevation of it, showing the end which is at the left hand in Fig. 1. Fig. 3 is a transverse sectional elevation showing the parts which are at the right hand of the center of the machine in Fig. 1. Fig. 4 is a plan of the bed on which the leather is spread.

1 is the bed, the construction of which is clearly shown in Figs. 3 and 4. 2 2 are elastic fingers by which the leather is pressed down against the bed 1. They are held down by the levers 3 3, which are loaded at their outer ends by the weights 4 4. 5 is a roller which bears the leather down to the bed before the fingers begin to act upon it. 6 is a gage forward of the knife for regulating the depth of the cut of the latter and the consequent thickness of the split cut off. This gage is made adjustable by means of set-screws 24 24, which are set in the bed 1 and bear against the back side of the said gage, and both this gage and the edge of the knife 7 are made as straight as possible. 8 is the bed in which the knife 7 rests, and in which it is permitted to slide longitudinally for the purpose of giving a drawing cut. 9 is a drawing-roller by the rotation of which the leather is drawn through the machine, the leather being pressed down against said roller by the roller 10, to give the drawing-roller sufficient adhesion or friction upon the leather for that purpose. The thickness of the leather split which is cut off from the main part is determined by the height of the gage 6, which is regulated by the screws 24. If desirable, the rear gage, 25, which is made a part of the bed 8 and is intended to support the main thickness of the leather after it passes the knife, may be made adjustable in the same manner. 11 is a journal or shaft on which the roller 10 is hung in such a manner that it may be thrown back out of the way when it is desirable to do so. The roller 10 is held down against the leather by means of the lever 12, which catches into a notch made to receive it in the arm 13. The fingers 2 2 are adjusted in the same manner by means of the lever 14 and the arm 15.

Motion is communicated to the different parts of the machine by means of a belt acting on the pulley 16, and driving the shaft on which it is hung. Through this shaft the motion is carried to the double cam 17, which draws the rod 20, to which the knife 7 is attached, toward the said cam, and after the extreme projection of the cam passes by the roller 18 the knife is thrown or drawn in the opposite direction by the spring 19, thus producing a reciprocating motion of the knife 7. Motion is also communicated from the shaft on which the pulley 16 is hung to the shaft on which the wheel or pulley 21 is hung, and from thence by means of the wheels 22 and 23 it is communicated to the drawing-roller 9.

The leather in passing through the machine is first introduced between the bed 1 and the roller 5, where it comes in contact with and is drawn over the corrugations shown on the bed in Fig. 4, which, as is evident from their form and direction, will spread it out laterally. When passing over the ridge in the center between the roller 5 and the fingers 2 2, it passes under the said fingers, which cause it to bear equally upon the gage 6. From this point the leather is passed over the knife and the gage 25 to the rollers 9 and 10, between which it is grasped, and the motion of the roller 9 draws the leather tightly against the two gages and over the edge of the knife, the adjustment of the front gage regulating the depth of the cut of the knife.

It will be obvious from the foregoing description and a careful examination of the parts that there is no pressure upon the leather over the cutting-edge of the knife, except what is derived from the tension of the leather itself, and that consequently the leather is not compressed materially at this point, but is left to adjust itself to the edge of the knife by its own tension, and not by compression. This is an important feature, for every skin as it comes to the machine is not only of uneven thickness in its various parts, but these parts are also of unequal compressibility. If then compression is relied on to bring the leather in contact with the knife, it is clear that the soft and more compressible parts of the skin will be more reduced from their natural thickness by such pressure than the more solid parts, and it therefore will be obvious that when the split is relieved from pressure and allowed to expand to its natural condition, these parts which have yielded most to compression will necessarily be thicker than those which have yielded less. By using the tension of the leather itself as the power to hold it to the knife we avoid this difficulty, and are besides enabled to spread the leather properly for splitting with greater facility.

We claim—

1. The combination of the bed 1, fingers 2 2, and roller 5, or equivalent device for spreading and holding the leather, the knife 7 or its equivalent for splitting the leather, and the drawing-rollers 9 and 10 or equivalent device for drawing the leather through the machine, these three parts or elements, to wit: the spreading and holding device, the knife, and the drawing device, being so combined, as to accomplish the result stated—that is to say, to draw and hold the leather to the knife by its own tension instead of by pressure, not confining ourselves to the particular form or construction of the various parts so long as these three essential elements are combined, substantially as and to the effect above set forth.

2. The combination of the gage 6 with the spreading and holding device, knife, and drawing device, above defined, substantially as and to the effect above stated.

3. The combination of the corrugated bed 1, the weighted fingers 2, and the roller 5, substantially as and for the purpose set forth.

A. H. VAN GIESON.
E. A. SMITH.

Witnesses:
JOHN E. HUGHES,
JAMES T. GRAHAM.